INVENTOR.
BAARD H. THUE

United States Patent Office 3,344,423
Patented Sept. 26, 1967

3,344,423
CONTROL APPARATUS
Baard H. Thue, Minneapolis, Minn., assignor to Honeywell Inc., Minneapolis, Minn., a corporation of Delaware
Filed July 5, 1966, Ser. No. 562,580
4 Claims. (Cl. 343—14)

ABSTRACT OF THE DISCLOSURE

A frequency modulated radio altimeter in which a reflected signal is beat or mixed with the instantaneous transmitted signal and the resulting beat frequency spectrum is translated in frequency an amount to keep it located at a fixed point. The amount of frequency translation is a measure of the altitude. The beat frequency spectrum is continuously translated by means of a servo loop which provides an output voltage which is proportional to the amount of translation and hence the altitude.

The subject of this invention pertains to a frequency modulated radio altimeter.

A feature of the invention is the method of demodulating a return signal reflected from a surface to produce a signal which is a function of the distance to the surface.

Figure 1:
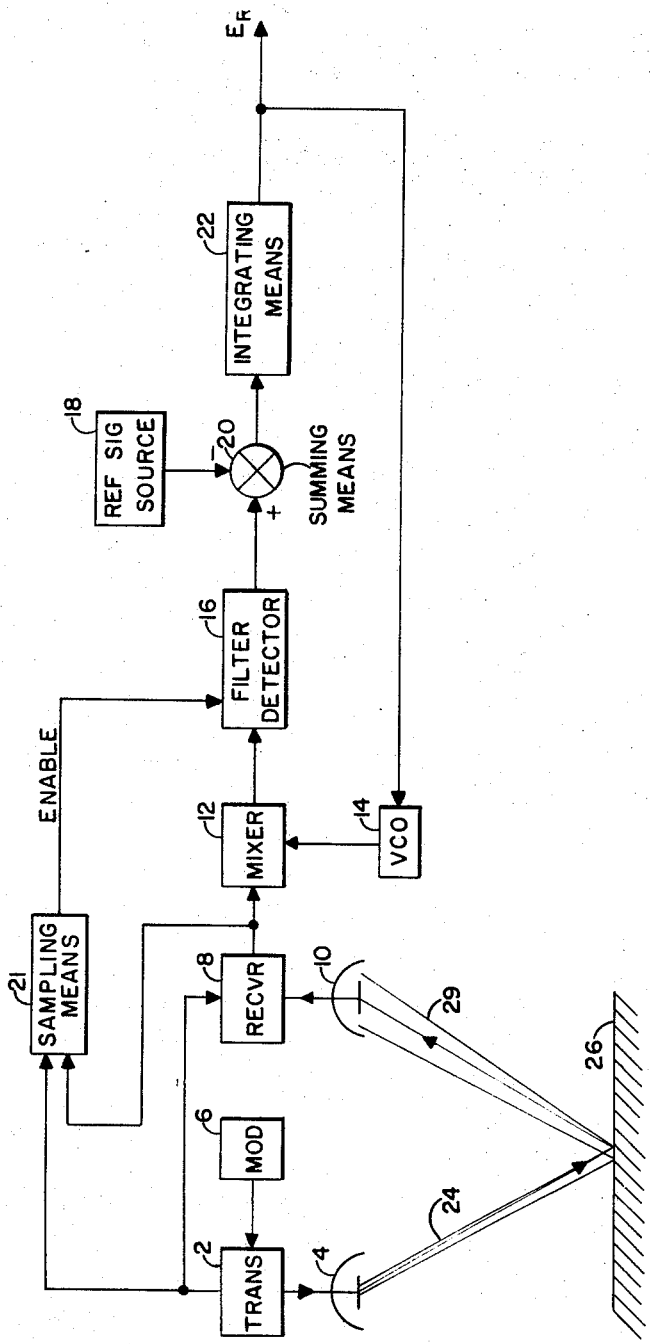
Figure 2:
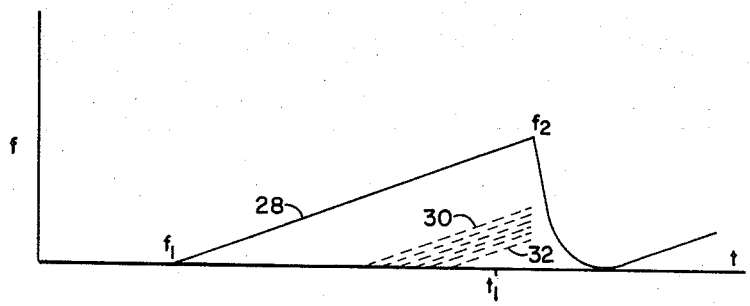
Figure 3:
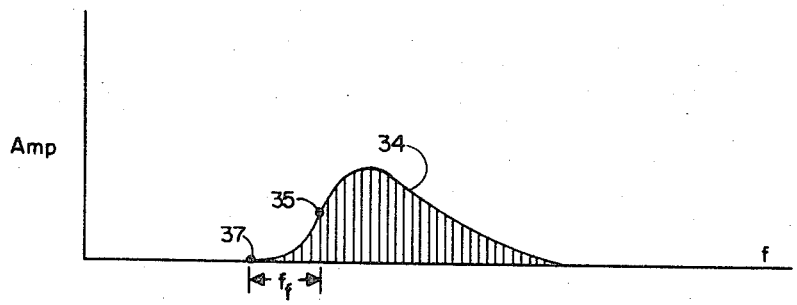
Figure 4:
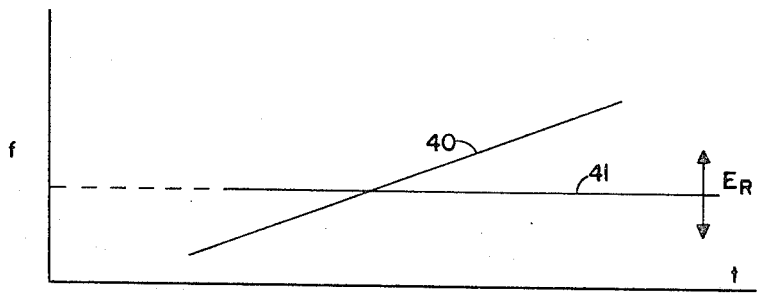
Figure 5:
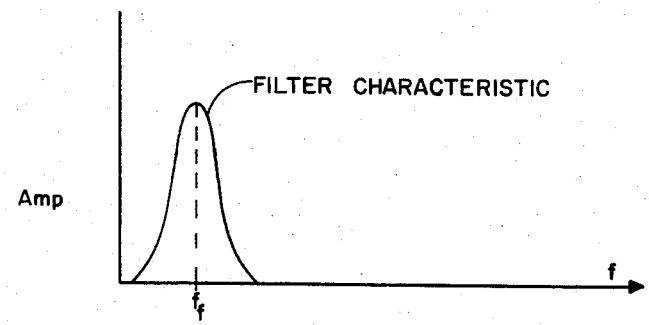
Figure 6:
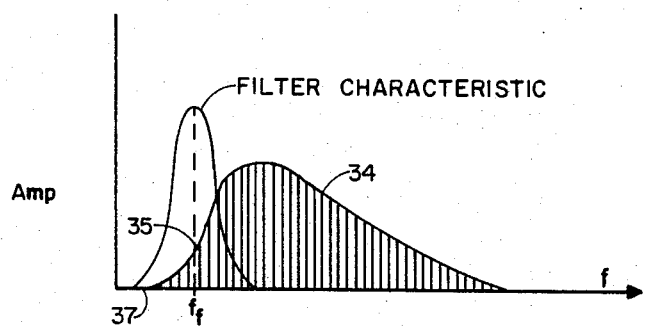

The nature of the invention and the distinguishing features and advantages thereof will be understood from the following description and accompanying drawings of which FIGURE 1 is a block diagram of an FM radio altimeter using the demodulation method and FIGURE 2 is a graph of the frequency of a transmitter in the altimeter as a function of time; FIGURE 3 is a graph of the frequency spectrum at the output of the receiver in the altimeter; FIGURE 4 is a graph of the frequency of a voltage controlled oscillator in the altimeter as a function of the output signal (voltage) of the altimeter; FIGURE 5 is a graph of the frequency response characteristic of a filter-detector in the altimeter; and, FIGURE 6 shows a graph of the frequency response characteristic of FIGURE 5 superimposed on the receiver frequency spectrum of FIGURE 3.

The altimeter of FIGURE 1 comprises an FM transmitter 2, a transmitting antenna 4, a modulator 6, a receiver 8, a receiving antenna 10, a mixer 12, a voltage controlled oscillator 14, a filter-detector unit 16, a reference signal source 18, a summing means 20, sampling means 21, and an integrating means 22.

Modulator 6 functions as the system clock, or timer, and frequency modulates transmitter 2. Line 28 in FIGURE 2, a graph of frequency as a function of time, represents the frequency of transmitter 2 as a function of time as modulated by modulator 6 during a modulation cycle. Although the transmitter frequency is shown as a linear function of time, other functions might be used. Antenna 4 is coupled to transmitter 2 and radiates the energy generated thereby into space, e.g., generally along a path 24 toward a surface 26 (e.g., the earth).

Energy radiated by antenna 4 is reflected at surface 26, generally along a path 29, to receiving antenna 10 where it is absorbed and mixed with a small part of the signal then being generated by transmitter 2. The signal at the output of receiver 8 has a frequency which represents the difference in frequency between the transmitter signal 28 and the reflected signal at antenna 10, i.e., it is a beat frequency signal. The reflected signal cannot be represented by a single line on the graph of FIGURE 2 but must be represented by a series of lines (shown dashed) such as 30, 32, etc. This is primarily because the transmitted energy is not confined to a line but is dispersed, i.e., has a beam width. Thus energy at a particular frequency reaches the surface at different times because of the difference in path lengths and for the same reason is reflected back at different times. Thus the energy applied to receiver 8 is spread out in time and at a particular time, e.g., $t_1$, corresponds to a band of frequencies rather than a single frequency. Line 30 represents the earliest returning energy and line 32 the latest returning energy. The vertical displacement on the graph between a dashed line such as 30 and the line 28 represents the frequency of the signal at the output of receiver 8.

In FIGURE 2, the horizontal distance between lines 28 and 30 is indicative of the time necessary for a transmitted signal to be received over the shortest path and is thus indicative of altitude. By simple trigonometry it is seen that the vertical distance between lines 28 and 30 is proportional to the horizontal distance and is thus also indicative of altitude. With line 28 straight as shown the ratio of the vertical and horizontal distances is given by the tangent and does not vary but when line 28 is chosen to be some other function the relation between vertical and horizontal distance is more complicated.

In the present invention, an output indicative of the vertical displacement between lines 28 and 30 of FIGURE 2 is provided as an indication of altitude, as will be seen.

Shown in FIGURE 3 is a spectrum 34 of the band of difference frequencies at the output of receiver 8. Amplitude is represented by the vertical displacement, frequency by the horizontal displacement. Frequency spectrum 34 is independent of time during the period under consideration, e.g., $t_1$, and is continuous.

The vertical distance between lines 28 and 30 in FIGURE 2 is represented by the frequency at point 37 in FIGURE 3 since receiver 8 operates to subtract the signals from transmitter 2 and antenna 10. Since the vertical distance between lines 28 and 30 of FIGURE 2 is related to altitude, a determination of the frequency at point 37 would provide the output necessary. Unfortunately, the measurement of frequency at point 37 is not possible as a practical matter since the signal has insignificant amplitude at this point. Accordingly an arbitrary point is chosen near point 37 but which has amplitude large enough to be useful. In FIGURE 3 a point identified by reference numeral 35 is chosen for this purpose. By determining the frequency at point 35 the frequency of point 37 is substantially known since the shape of the curve does not change appreciably during normal operation. The apparatus described below operates to produce an output voltage of magnitude indicative of the frequency at point 35 of FIGURE 3 and thus provides an indication of altitude.

A DC signal from source 18 is applied to integrating means 22 through summing means 20, and the output of integrating means 22 is applied to the voltage controlled oscillator 14. The frequency of oscillator 14 is a function of the output of integrating means 22. In FIGURE 4 line 40 represents the frequency range of oscillator 14, line 41 represents the output voltage of integrating means 22, this voltage designated $E_R$. As $E_R$ increases or decreases line 41 intersects line 40 at a higher or lower frequency respectively, the point of intersection corresponding to the operating frequency of oscillator 14. It is seen that the frequency of oscillator 14 is a linear function of the output voltage of integrating means 22. An output signal from oscillator 14 is applied to mixer 12 where it is mixed with the output signal from receiver 8. The output signal from receiver 8 is the spectrum 34, or band shown in FIGURE 3.

The effect of mixing the spectrum 34 and the output of oscillator 14 in mixer 12 is to translate spectrum 34 downward in frequency along the frequency axis an amount equal to the frequency of oscillator 14. This translated frequency band is the output of mixer 12.

As mentioned above, the frequency of the signal at point 35 in FIGURE 3 from some arbitrary reference is indicative of altitude. This frequency is measured by moving the entire curve of FIGURE 3 to the left until it reaches a predetermined position. The amount the curve is moved to the left is then a measure of the frequency at point 35 and thus an indication of altitude.

Filter-detector 16 has a frequency characteristic as shown in FIGURE 5. Only a narrow band of frequencies centered around a chosen frequency $f_t$ will pass through the filter-detector 16. Frequency $f_t$ is chosen so that it is the difference in frequency between a point 35 on the leading edge of spectrum 34 and a point 37 at the lower end of the spectrum.

Because the effect of oscillator 14 is to translate spectrum 34 along the frequency axis, the voltage $E_R$ may be so adjusted that spectrum 34 may be positioned on the frequency axis until point 35 corresponds to a frequency $f_t$ and the leading edge or lefthand side of the spectrum will pass through filter-detector 16 and be smoothed or rectified, i.e., the output of filter-detector 16 is a direct current proportional to the amplitude of the passed portion of the translated spectrum 34. It is to be noted that the spectrum envelope must be kept relatively constant. This is done by providing a receiver with A.G.C. In addition, sampling means 21 which monitors the start and end of the linear portion of the transmitter signal and the beginning of the received signal produces an enable signal, when both are present, to enable filter 16. This insures sampling the translated spectrum 34 during periods when, such as at $t_1$, the difference between the transmitted frequency and the band of frequencies represented by dashed lines 30, 32, etc., is fixed. The direct current produced by filter-detector 16 is applied to summing means 20 where it is algebraically summed with the current reference 18 and the sum is applied as an input to integrating means 22. It is to be noted that the two currents to summing means 20 are of opposite sense so that the algebraic sum is zero when they are equal.

Proper adjustment of the system parameters will allow the input to integrating means 22 to become zero for the condition shown in FIGURE 6. With a null (zero) signal present at the input to integrating means 22 the output thereof, $E_R$, remains constant at whatever value has been attained in order to produce the situation described by FIGURE 6. Because the initial position of spectrum 34 is directly representative of the length of path 24, 29 and because a known linear relationship exists between $E_R$ and the amount of frequency translation necessary to properly position spectrum 34 with respect to the filter characteristic of filter-detector 16 it follows that $E_R$ is proportional to the length of path 24, 29.

If a variation in the length of path 24, 29 causes the translated spectrum 34 in FIGURE 6 to move to either the left or right on the frequency axis, the null condition at the input to integrating means 22 will be disturbed and $E_R$ will change to again obtain a null. The null will be maintained by the tracking loop comprising mixer 12, filter-detector 16, source 18, summing means 20, integrating means 22, and voltage controlled oscillator 14, such that at any time $E_R$ will be representative of the distance to the nearest point in the reflecting surface.

For a discussion of mixers see Principles of Radar, third edition, by Reintjes and Coate, pp. 441, 876, 881; see Vacuum Tube Amplifiers, vol. 8, Rad Lab Series, Chapter 10, for a discussion relative to narrow band pass filters. An example of integrating means is shown in Patent No. 3,242,488, granted Mar. 22, 1966.

The advantage of this system is realized because FM transmission is combined with leading edge tracking concepts, resulting in a system which has the best features of both.

It is to be understood that this arrangement is illustrative of the application of the principles of the invention. Other arrangements may be devised by those skilled in the art without departing from the scope of the invention.

What is claimed is:
1. A radio altimeter comprising in combination:
   a frequency modulated transmitter, normally radiating a signal toward a reflecting surface;
   a receiver normally absorbing a component of the signal reflected from the surface, said receiver coupled to said transmitter and receiving a signal directly therefrom, said receiver producing a signal having a frequency corresponding to the difference in frequency of said transmitter signal and the reflected signal;
   a steady state reference signal source;
   means coupled to said source for algebraically summing said reference signal and an error signal;
   means coupled to said summing means for integrating the algebraic sum;
   an oscillator coupled to said integrating means and controlled in frequency by the integrated sum;
   means coupled to said receiver and said oscillator for mixing the signal produced by said receiver with the signal generated by said oscillator and producing a difference frequency signal, the mixing means operating to translate the receiver signal in frequency;
   a narrow bandpass filter coupled to the mixing means and having a predetermined center frequency, said filter means passing the translated receiver signal whenever the translated signal is within the bandpass of said filter; and
   means for detecting the signals passed by said filter and rectifying the passed signals to produce a substantially steady state signal which is coupled to the summing means and represents the error signal, the integrating means, oscillator, mixing means, filter, and detector normally operating to keep the algebraic sum nulled.

2. The apparatus of claim 1 wherein the relationship between the integrated algebraic sum and the frequency of the oscillator controlled thereby is linear.

3. In a radio distance measuring apparatus developing a reflected signal comprising a band of frequencies delayed in time from a transmitted signal, the time delay representing the distance to a reflecting surface, and generating a difference signal corresponding to the frequency difference between the transmitted and reflected signals:
   means operating on the difference signal to translate it in frequency;
   a narrow bandpass filter coupled to the means for translating and producing an output signal when the translated signal contains frequencies within the bandpass of said filter;

means coupled to said filter to detect and rectify the output signal thereof;
a reference signal source;
means coupled to said source and to the means for detecting and rectifying, algebraically summing the signals therefrom;
means for integrating the sum, the resulting integrated signal fed back to the means for translating, the means for translating changing its frequency as a function of the integrated signal to keep the sum constant, the integrated signal representing the time delay between the transmitted and reflected signals and hence the distance to the reflecting surface.

4. The apparatus of claim 3 wherein the translating means operates at a frequency linearly proportional to the integrated signal.

References Cited

UNITED STATES PATENTS 3,065,465  11/1962  Wimberly _____ 343—17.2 X

RODNEY D. BENNETT, *Primary Examiner.*

J. P. MORRIS, *Assistant Examiner.*